United States Patent [19]

Watt

[11] Patent Number: 5,802,598
[45] Date of Patent: Sep. 1, 1998

[54] DATA MEMORY ACCESS CONTROL AND METHOD USING FIXED SIZE MEMORY SECTIONS THAT ARE SUB-DIVIDED INTO A FIXED NUMBER OF VARIABLE SIZE SUB-SECTIONS

[75] Inventor: Simon Charles Watt, Cambridge, United Kingdom

[73] Assignee: Advanced Machines Risc Limited, Great Britain

[21] Appl. No.: 538,291

[22] Filed: Oct. 2, 1995

[30] Foreign Application Priority Data

Jun. 23, 1995 [GB] United Kingdom ............... 9512860

[51] Int. Cl.⁶ .......................................... G06F 12/00
[52] U.S. Cl. ........................ 711/170; 364/DIG. 1; 364/243; 364/238.4; 711/111; 711/154; 711/171; 711/172
[58] Field of Search ........................ 395/438, 445, 395/481, 403, 416–417, 497; 364/DIG. 1, 243, 243.4, 238.4, DIG. 2; 711/3, 206–207, 111, 118, 154, 170–172

[56] References Cited

U.S. PATENT DOCUMENTS

| | | | |
|---|---|---|---|
| 4,613,953 | 9/1986 | Bush et al. | 364/900 |
| 4,853,848 | 8/1989 | Mitsuhashi et al. | 395/445 |
| 5,014,240 | 5/1991 | Suzuki | 365/49 |
| 5,099,233 | 3/1992 | Keenan | 340/825.72 |
| 5,251,311 | 10/1993 | Kasai | 395/471 |
| 5,317,711 | 5/1994 | Bourekas et al. | 395/184.1 |
| 5,509,133 | 4/1996 | Nishimukai et al. | 393/440 |

*Primary Examiner*—Tod R. Swann
*Assistant Examiner*—Tuan V. Thai
*Attorney, Agent, or Firm*—Fenwick & West LLP

[57] ABSTRACT

A data processing system and method include an address space which is controlled by a memory management unit and which is treated as being divided into main-sections (chunks) and sub-sections (grains). The grains may be configured to be of one of a selected number of sizes. Irrespective of the grain size, there is a fixed number of grains within each chunk. A bank of grain registers 20 stores access control parameters for each grain. In operation, a memory address (va[31:0]) is decoded to determine which chunk it relates to so that the grain size for that chunk may be determined. Having determined the grain size, the rest of the address may be decoded to pick out the grain in which the address is located, and then the access control parameters for that grain are recovered.

18 Claims, 11 Drawing Sheets

DATA MEMORY ACCESS CONTROL AND METHOD USING FIXED SIZE MEMORY SECTIONS THAT ARE SUB-DIVIDED INTO A FIXED NUMBER OF VARIABLE SIZE SUB-SECTIONS

BACKGROUND OF THE INVENTION

1. Field of the Invention

This invention relates to the field of data processing. More particularly, this invention relates to data processing systems having a memory management controller for controlling access to different portions of a data memory.

2. Description of the Prior Art

It is known to provide data processing systems incorporating memory management controllers/memory management units/MMUs that serve to control access to different portions of a data memory. Such memory management units are particularly useful in multi-tasking processing systems in which it is desired to separate the tasks so that they are unable to alter the data from another task unless so desired. This provides an additional degree of reliability in that a problem within one task is restrained from spreading and corrupting another task.

In typical mainframe computer implementations of such protection, the data defining which tasks have access to which areas of physical memory is stored in page table definitions that may be held in random access memory external of the central processing unit. Alternatively, integrated circuits, such as the ARM600 (produced by Advanced RISC Machines Limited), can incorporate an on-chip memory management unit. Such an on-chip approach increases the speed of operation by avoiding the need for off-chip access to the memory management unit data and avoids the additional complication and expense of having to provide additional data memory outside of the integrated circuit carrying the cental processing unit core. The avoidance of the need for additional circuit elements external of the integrated circuit carrying the central processing unit core is particularly important in applications, such as embedded controllers, where size and expense are critical.

A significant factor within the design of memory management units is the address resolution at which they allow memory accesses to be controlled. For example, the data memory of the system may be divided into 4 kBytes sections, with the access to each address within a 4 kBytes section being managed upon a common basis, i.e. for each section the tasks having access to that section and the type of access provided are separately defined. Accordingly, a set of access control parameters need to be stored for each 4 kBytes section of the data memory.

In some circumstances it is desirable to provide a high degree of address resolution for the control of the access to the data memory by dividing the data memory into sections of small size that may be independently managed. For example, such small blocks are appropriate when the data memory represents directly mapped input/output locations or a section of memory storing critical control parameters that need to be separately handled. In order to deal with such situations, it may be desirable to provide a resolution with sections of 256 Bytes.

In contrast to this, in the case of access to a read only memory storing fixed program instructions or data (e.g. font defining data within a printer), the large quantity of data concerned only needs controlling at a level of course resolution. In this case, controlling access in 4 MBytes sections would be appropriate.

The conventional approach to dealing with such conflicting requirements is that the memory management unit should have a resolution capable of dealing with the smallest section size that is desired within the full address space of the system, i.e. if some areas need controlling at a fine address resolution of 256 Bytes, then the whole address space is controlled at such a resolution. This results in a disadvantageously large amount of storage being required to hold the access control parameters for the entire address space. This is particularly the case where the access control parameters are stored on-chip where the need to store a large amount of access control parameters results in a disadvantageous increase in the size of the integrated circuit required. Increases in integrated circuit size result in an increase in the cost of the integrated circuit (due to a reduction in manufacturing yield) and to an increase in the power consumption of the circuit (due to the need to drive the additional circuit elements, particularly if dynamic memory cells are used in an effort to reduce circuit size).

The present invention addresses the problem of providing the possibility of a fine address resolution in the size of data memory sections that may be separately controlled whilst avoiding a disadvantageous increase in the amount of data storage needed to handle the access control parameters for the whole system.

SUMMARY OF THE INVENTION

Viewed from one aspect this invention provides apparatus for processing data, said apparatus comprising:

(i) a data memory for storing data words at respective memory addresses within an address space of said data memory;

(ii) means for generating an access request to a data word stored at a specified memory address within said data memory; and (iii) a memory management controller for controlling processing of said access request; wherein (iv) said memory management controller divides said address space into a plurality of fixed size main-sections, each main-section containing a fixed number of sub-sections with sub-section size being constant within a main-section and independently set for each main-section; and (v) said memory management controller stores one or more access control parameters for each sub-section, said access control parameters for a sub-section being used by said memory management controller to control processing of an access request to a specified memory address within said sub-section.

The invention recognizes that widely different resolutions of access control may be provided within a single address space without a disadvantageous complexity by providing a fixed number of sub-sections of variable size within each main-section. With this approach, it will be appreciated that if a small sub-section size is used for the fixed number of sub-sections within a main-section, then a large area of the address space within that main-section will be outside of all of the sub-sections and will effectively be unmapped. Such a lack of contiguousness within a system runs against the trend within the field. However, providing a fixed number of sub-sections within a main-section results in a fixed number of access control parameters being required for the system irrespective of what resolution is chosen for each main-section. This avoids large amounts of storage being required for the access control parameters when fine resolutions are selected. The non-contiguous nature of the memory map would normally be considered a disadvantage, however, given the large increases in available address space provided by the trend towards wide addresses, what might be perceived as a waste of address space is not a problem.

Whilst the invention may be used in situations where the sub-section size within each main-section is fixed during manufacture of the system (e.g. in the case of an embedded controller with a fixed configuration), an increased degree of flexibility to cope with changes in the system configuration (e.g. different options of installed RAM size) is provided by preferred embodiments comprising a plurality of main-section registers each storing data defining sub-section size for a respective main-section.

Storing the data defining sub-section size within main-section registers allows it to be altered more readily.

It will be appreciated that the means for generating an access request could take any number of forms (e.g. an access request from a disc drive controller). However, the invention is particularly suited for use in embodiments in which said means for generating an access request comprises a central processing unit core.

As previously mentioned, main-section registers may be provided for storing data defining sub-section size. These main-section registers may be written to by fixed hardware elements, such as dip-switches, in a manner such that the configuration of the sub-section sizes may be changed without a major hardware re-design. However, in preferred embodiments of the invention said data defining sub-section size is written to said main-section registers under program instruction control.

Writing the data to the main-section registers under program control enables an advantageously high degree of flexibility in the configuration of the system with a small amount of effort by a user.

A problem with allowing the main-section registers to be written under program control is that a bug within a program may possibly cause these main-section registers to be written to with inappropriate data which does not represent the physical hardware configuration that is present. The data within the main-section registers is critical to the operation of the whole system and such corruption of the data could potentially cause serious problems and data loss.

In order to reduce this possibility, preferred embodiments of the invention comprise a coprocessor to said central processing unit core, said main-section registers being written under control of program instructions executed by said coprocessor.

Allowing the coprocessor rather than the central processing unit core to write to the main-section registers reduces the possibility of the main-section register data being corrupted. The coprocessor only generally operates on a well defined subset of instructions and so bugs within its operation and the likelihood of it undertaking inappropriate writing actions to the main-section registers is reduced.

An advantageously simple way of partitioning the address space is that one or more main-section bits with a fixed position within said specified memory address define a main-section containing said specified memory address.

Having such fixed position main-section bits that map to the main-section concerned enables a simple decoding of a specific memory address to determine the main-section concerned and hence the sub-section size for that memory address.

It is preferred to provide one or more sub-section bits with a variable position within said specified memory address define a sub-section containing said specified memory address. Given that the sub-sections vary in size, such variable position sub-section bits allow the sub-sections to be arranged contiguously within the address space of each main-section.

Given that the sub-section bits vary in position within the specified memory address, a particularly efficient embodiment of the invention provides a barrel shifter for selecting said sub-section bits for decoding from within said specified memory address in dependence upon sub-section size for a main-section containing said specified memory address.

A barrel shifter is particularly suited to allow the high speed selection of the sub-section bits in dependence upon sub-section size.

The access control parameters utilised by the memory management controller are relatively dynamic data that it is desirable to be able to modify during program execution. Accordingly, preferred embodiments of the invention provide a plurality of sub-section registers each storing said one or more access control parameters for a respective sub-section.

The most convenient manner in which the access control parameters may be dynamically modified is to provide that said one or more access control parameters are written to said sub-section registers under program instruction control.

In contrast to the data stored within the main section registers, the data within the sub-section registers is less fundamental to the configuration of the device and is more likely to be regularly modified. Accordingly, it is desirable that said sub-section registers are written under control of program instructions executed by said central processing unit core.

The selection of an appropriate sub-section register for a given specified memory address may be conveniently achieved in embodiments in which said sub-section registers are addressed to read said access control parameters for said specified memory address in response to said main-section bits and said sub-section bits.

As previously mentioned, the invention introduces a degree of non-contiguousness into the memory map of the system. Accordingly, a particular danger exists that memory accesses will be made to undefined areas. In order to counteract this problem, preferred embodiments of the invention provide an abort signal generator for detecting an access request to a specified memory address outside of any sub-section.

Given the variable size of the sub-sections resulting in different parts of the address space being undefined in different configurations, preferred embodiments are such that said main-section bits are the most significant bits of said specified memory address and said sub-section bits are less significant bits of said specified memory address, said abort signal generator generating an abort signal if any bits of said specified memory address between said main-section bits and said sub-section bits are set.

The large amounts of address space within processors having wide address buses enables the provision of systems in which one or more main-sections are reserved. In such systems, it is preferred that said abort signal generators generates an abort signal if said specified memory address lies within a reserved main-section.

The access control parameters utilised by the memory management controller can take many forms. Particularly preferred control parameters include a flag indicating whether a write request may be buffered in a write buffer, a flag indicating whether a write request may be written into a cache memory and flags indicating which mode of processor operation should be allowed to have a particularly type of access to a given sub-section.

The invention may be implemented as discrete circuit components. However, as previously mentioned, the invention is particularly suitable for use in embodiments comprising an integrated circuit. In such embodiments, the saving in circuit area over a conventional memory management unit is highly significant.

Viewed from another aspect this invention provides a method of data processing, said method comprising the steps of:

(i) storing data words at respective memory addresses within an address space of a data memory;

(ii) generating an access request to a data word stored at a specified memory address within said data memory; and (iii) controlling processing of said access request with a memory management controller; wherein (iv) said memory management controller divides said address space into a plurality of fixed size main-sections, each main-section containing a fixed number of sub-sections with sub-section size being constant within a main-section and independently set for each main-section; and (v) said memory management controller stores one or more access control parameters for each sub-section, said access control parameters for a sub-section being used by said memory management controller to control processing of an access request to a specified memory address within said sub-section.

The above, and other objects, features and advantages of this invention will be apparent from the following detailed description of illustrative embodiments which is to be read in connection with the accompanying drawings.

DESCRIPTION OF THE PREFERRED EMBODIMENTS

Figure 1:
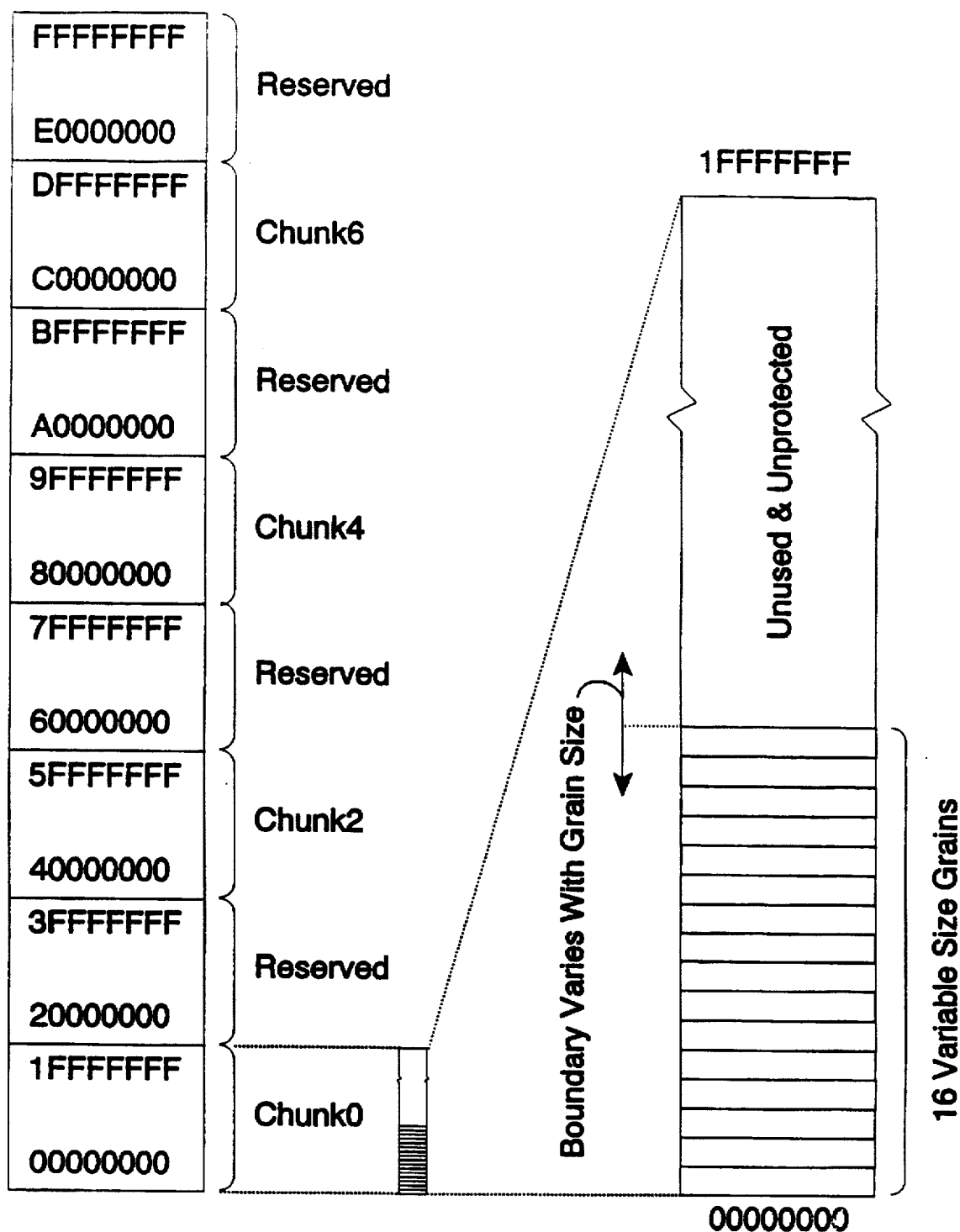
FIG. 1 illustrates the memory map of a 32-bit address space.

FIG. 1 shows an address space map for a 32-bit system. The address space is divided into eight equally sized main-sections or chunks. The eight chunks extend from Chunk0 to Chunk7. The odd numbered chunks are reserved in this implementation. The lowermost main-section (Chunk0) extends from memory addresses 00000000 to 1FFFFFFF (hexadecimal), i.e. 32 MBytes.

Each chunk contains 16 sub-sections or grains. The size of the grains may be varied between chunks, i.e. Chunk0 may contain grains each of 256 Bytes, with Chunk2 containing grains of 1 MByte. The grains extend contiguously up from the lowermost address within a chunk. The top boundary of the uppermost grain will vary in position in dependence upon the grain size for that chunk. The area of address space between the uppermost boundary of the top grain and the uppermost address within the chunk is unused and unprotected.

Figure 2:
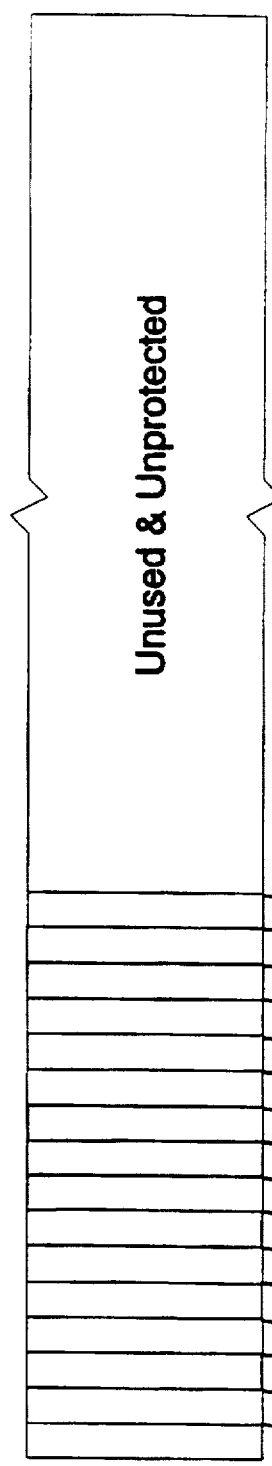
FIG. 2 illustrates a main section of address space with sub-sections of differing sizes.
Figure 2:
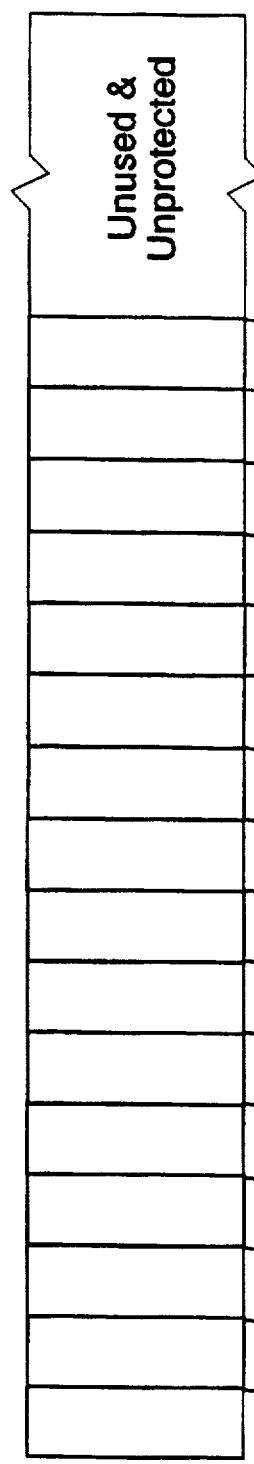

FIG. 2 illustrates Chunk0 in two alternative configurations, one with 256 Bytes grains and one with 1 kByte grains. In the case of the 256 Bytes grains, the lowermost grain extends from address 00000000 to address 000000FF. The other grains follow contiguously until the uppermost address of the uppermost grain at memory location 00000FFF. This grain size is the smallest grain size supported by the particular implementation described herein. Smaller grain sizes are possible in other implementations. A small grain size would be appropriate for a chunk of memory dealing with input/output address space or a small on-chip random access memory.

FIG. 2 also illustrates the same main-section of address space that is Chunk0 configured with grains each having a grain size of 1 kByte. In this configuration, the lowermost grain extends from address 00000000 to address 000003FF. The uppermost address within the uppermost grain is at memory address 00003FFF. The area of address space between 00004000 and 1FFFFFFF is unused and unprotected.

Figure 3:
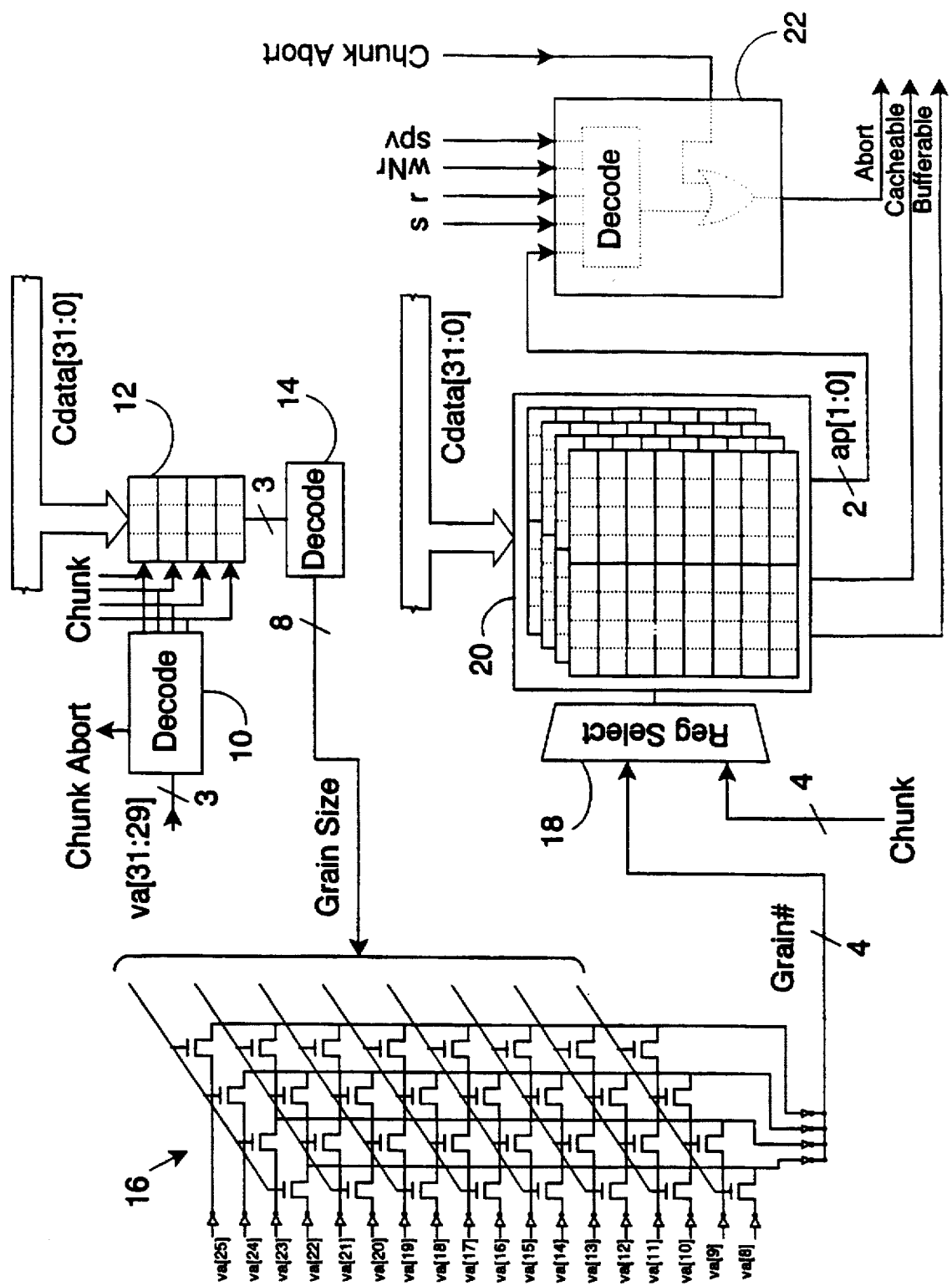
FIG. 3 illustrates a part of a memory management unit.

FIG. 3 illustrates part of a memory management unit. At an overall functional level, the memory management unit receives a specified address va[31:0] and returns for that address signals indicating whether the access concerned is bufferable, cacheable or should be aborted. In order to achieve this, the memory management unit also requires a number of inputs indicating the status of the data processing system in order to generate the appropriate outputs that are dependent upon such status variables.

The uppermost three bits of the virtual address va[31:29] specify the chunk within which the virtual address lies. These three bits are input to a chunk decoder 10 that serves to generate a 4-bit output indicating which of the valid chunks is being accessed or a chunk abort signal if the three bits indicate an address within one of the reserved sections of the address space illustrated in FIG. 1. Assuming a valid chunk has been accessed, one of the bits output from the chunk decoder 10 will go high. This selects one of four chunk registers 12 that each store a 3-bit code indicating the grain size for that chunk. The 3-bit code stored within the selected one of the chunk registers 12 is passed to a grain decoder 14.

The grain decoder 14 takes its 3-bit input specifying the grain size for the accessed chunk and maps this to control one of eight bit lines that are its output to move to a low value. The other seven bit lines output from the grain decoder 14 remain high. The different 3-bit chunk register codes with their corresponding grain sizes are shown in Table 1.

TABLE 1

| Chunk Register Code | Grain Size |
| --- | --- |
| 0 | 256B |
| 1 | 1kB |
| 2 | 4kB |
| 3 | 16kB |
| 4 | 64kB |

TABLE 1-continued

| Chunk Register Code | Grain Size |
|---|---|
| 5 | 256kB |
| 6 | 1MB |
| 7 | 4MB |

The output from the grain decoder 14 is supplied to a barrel shifter 16. The bit line output from the grain decoder 14 with a low value serves to switch on (i.e. render transmissive) the four of the field effect transistors within the barrel shifter 16 that have their gates connected in common to the bit line concerned. Eighteen bits of the specified address va[25:8] are supplied as inputs to the barrel shifter 16. The barrel shifter 16 serves to select for output four bits from within these eighteen bits. Which four bits are selected is dependent upon which bit output from the grain decoder 14 is low.

With the sizes of the grains set out in Table 1, the four bits selected represent the grain number (Grain#) for the address being accessed. Consider the case of a grain size of 256 Bytes. In this case, the address space occupied within each chunk by the sixteen grains is that corresponding to the address bits va[11:0]. Of these address bits, the four bits va[11:8] represent which of sixteen grains the address is within, with the eight bits va[7:0] representing the particular memory location within the grain concerned. Accordingly, the barrel shifter 16 selects the four bits va[11:8] as the grain number.

The above operation has generated a 4-bit output from the chunk decoder 10 that specifies the chunk containing the address concerned and a 4-bit grain number from the barrel shifter 16 giving the grain concerned. Thus, from among all the grains within the memory address space, an individual grain has been identified. The four bits from the chunk decoder 10 and the four bits from the barrel shifter 16 are input to a register selector 18 that serves to select the appropriate one of 64 4-bit registers within a block of grain registers 20. Each 4-bit register within the block of grain registers 20 stores four bits of data that represent the access control parameters for the grain of memory concerned. One bit indicates whether data within that grain is bufferable, one bit indicates whether data within that grain is cacheable and two bits ap[1:0] are flags that are utilised to specify which mode of operation the system must be in to gain access to data within that grain. The flags indicating whether the data is cacheable or bufferable are output directly from the memory management unit. The flags ap[1:0] are fed to a mode decoder 22 for further processing.

The mode decoder 22 also receives a number of other flag inputs. A chunk abort signal from the chunk decoder 10 indicates whether the specified address va[31:0] is within a reserved chunk of the address space. A flag spv indicates wither the processor is currently operating within the supervisor mode. A flag wNr indicates whether the access is a read access or a write access. Flags s and r are set by a coprocessor and provide a user with the ability to modify how the other inputs to the mode decoder 22 will be handled. Table 2 indicates how the inputs to the mode decoder 22 map to an Abort signal output from the mode decoder.

TABLE 2

| ap[1:0] | s | r | Permissions Supervisor | User | Notes |
|---|---|---|---|---|---|
| 00 | 0 | 0 | No Access | No Access | Any access generates a permission fault |
| 00 | 1 | 0 | Read Only | No Access | Supervisor read only permitted |
| 00 | 0 | 1 | Read Only | Read Only | Any write generates a permission fault |
| 01 | x | x | Read/Write | No Access | Access allowed only in Supervisor mode |
| 10 | x | x | Read/Write | Read Only | Writes in User mode cause permission fault |
| 11 | x | x | Read/Write | Read/Write | All access types permitted in both modes |
| xx | 1 | 1 | | | Reserved |

Table 2 does not include the Chunk Abort signal. This Chunk Abort signal is ORed with the result obtained from the other inputs to generate the overall Abort signal output.

The contents of the chunk registers 12 defining the grain sizes are set via the general system data bus Cdata[31:0] under control of a coprocessor. The grain sizes are a function of the system configuration and need only be set upon initialisation of the system on power up. Using the coprocessor to perform this function reduces the likelihood of the main central processing unit core corrupting these values during erroneous operation.

In contrast, the access control parameters stored within the grain registers 20 vary depending upon the program instructions executing on the central processing unit core and will often be changed during operation. Accordingly, the access control parameters stored within the grain registers 20 are set via the general purpose data bus Cdata[31:0] under control of the central processing unit core.

Figure 4:
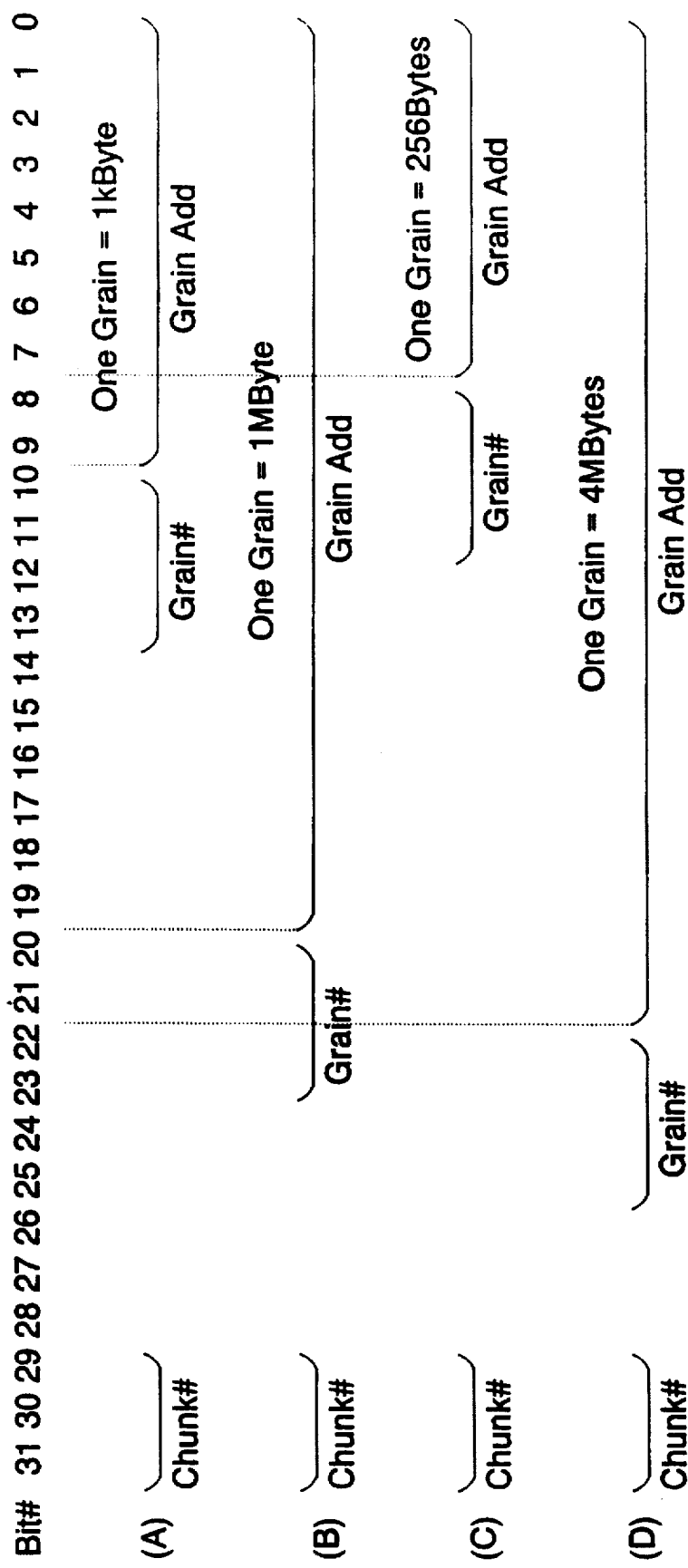
FIG. 4 illustrates the allocation of bit space within an address for differing sub-section sizes.

FIG. 4 illustrates the use of the bits within a 32-bit memory address for differing grain sizes. Example A is the case with 1 kByte grains. In this case bits 0 to 9 represent the address within a grain. Bits 13 to 10 represent the grain number, i.e. it is bits 13 to 10 that are selected to be output by the barrel shifter 16 of FIG. 3. The most significant three bits, bits 31 to 29, represent the chunk number. The bits 28 to 14 represent address space outside of the grains within each chunk having that grain size and are unused and unprotected address space. Access attempts to this unused and unprotected address space are detected and result in an abort.

Example B of FIG. 4 corresponds to the case where one grain has a size of 1 MByte. In this case, bits 19 to 0 correspond to the grain address and bits 23 to 20 correspond to the grain number. The chunk number is still given by the most significant three bits, bits 31 to 29.

Example C corresponds to a grain size of 256 Bytes. In this case, bits 7 to 0 correspond to the grain address, bits 11 to 8 correspond to the grain number and bits 31 to 29 correspond to the chunk number.

Finally, example D corresponds to a grain size of 4 MBytes. In this case, the grain address extends from bit 21 to bit 0, the grain address is found in bits 25 to 22 and the chunk address is still in bits 31 to 29. A grain size of 4 MBytes is the largest supported in this implementation (see Table 1), but does still not completely fill the address space within a chunk. Bits 28 to 26 are unused.

Figure 5:
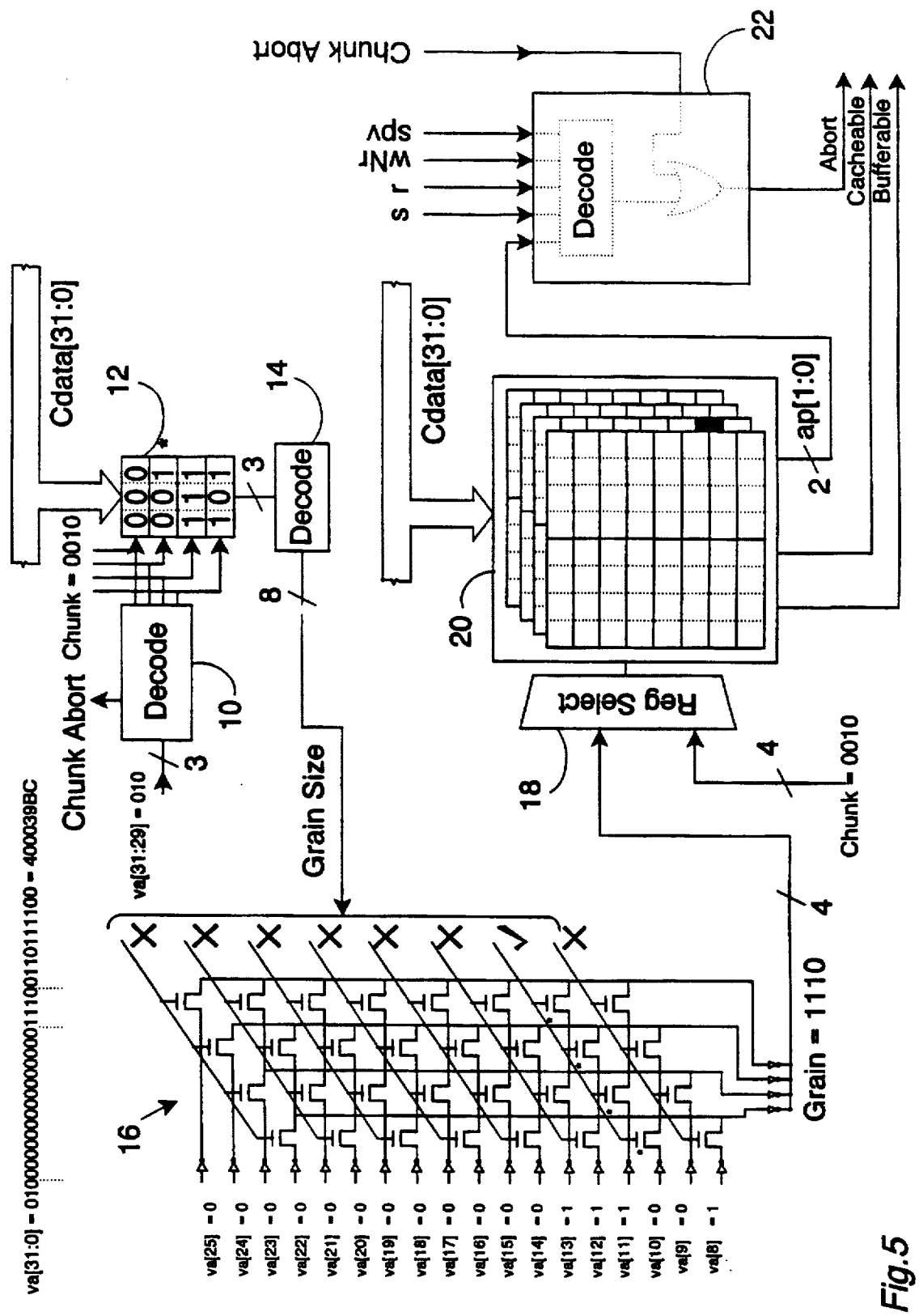
FIGS. 5 to 8 illustrate the operation of the system of FIG. 3 with main-sections containing sub-sections of differing sizes.

FIG. 5 illustrates the operation of the circuit of FIG. 3. In this case the memory is configured with chunks 0, 2, 4 and 6 respectively having grain sizes of 256 Bytes, 1 kByte, 4 MBytes and 256 kBytes. This is reflected by the various 3 bit codes stored within the chunk registers 12 (see Table 1).

In the example illustrated, an access attempt is being made to address 400039BC (hexadecimal). The most significant three bits of this address (va[31:29]) are 010. This corresponds to Chunk2. The chunk decoder 10 decodes these three bits and accesses the appropriate one of the chunk registers 12 which outputs a three bit code of 001 to the grain decoder 14.

The grain decoder 14 decodes the three bit code 001 and holds low the bit line corresponding to the four bits of the memory address va[13:10]. Accordingly, these four bits are picked out from the full address va[31:0] and output from the barrel shifter 16 has a four bit grain number 1110.

The above action of the chunk decoder 10 and the combined action of the grain decoder 14 with the barrel shifter 16 supplies a chunk number and a grain number to the register selector 18 which picks the register number E (hexadecimal) from its second bank (the second bank corresponds to the second chunk). The selected register is shown in black. The four access control parameters from the selected grain register are then output from the selected grain register. The mode decoder 22 receives the two bits ap[1:0] from the selected grain register and decodes them in conjunction with its other inputs to produce the Abort signal. The cacheable and bufferable flags are read directly from the selected grain register.

Figure 6:
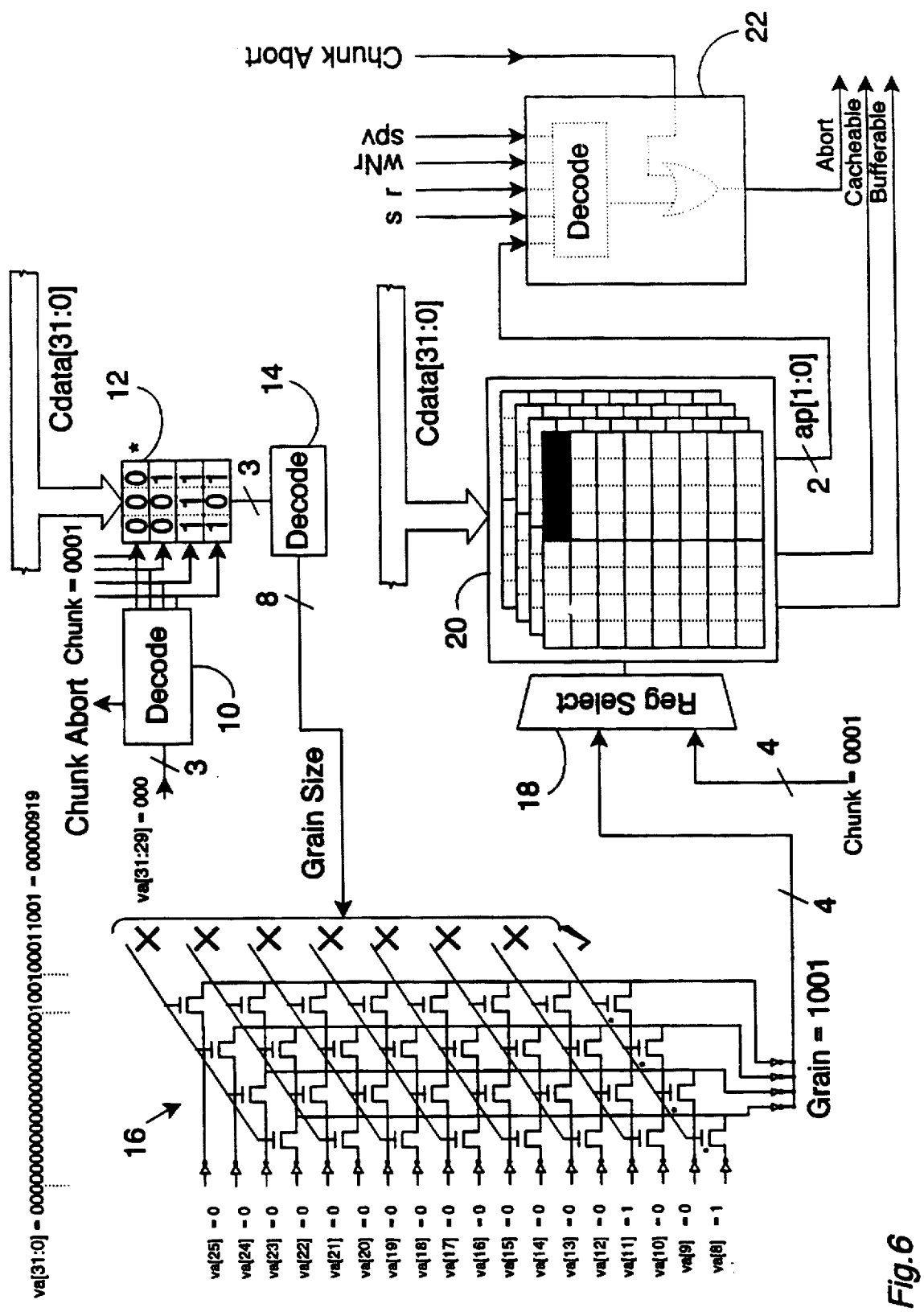

FIG. 6 illustrates and access to a memory address 00000919 (hexadecimal). This address lies within Chunk0. The chunk registers hold a three bit grain size code 000 for Chunk0. This is decoded by the grain decoder 14 to cause the barrel shifter 16 to select bits va[11:8] as the grain number. In this case, the four bits of grain number are 1001. The register selector 18 is responsive to the chunk specification and the grain specification to select register 9 within the first bank of 16 registers that correspond to Chunk0.

Figure 7:
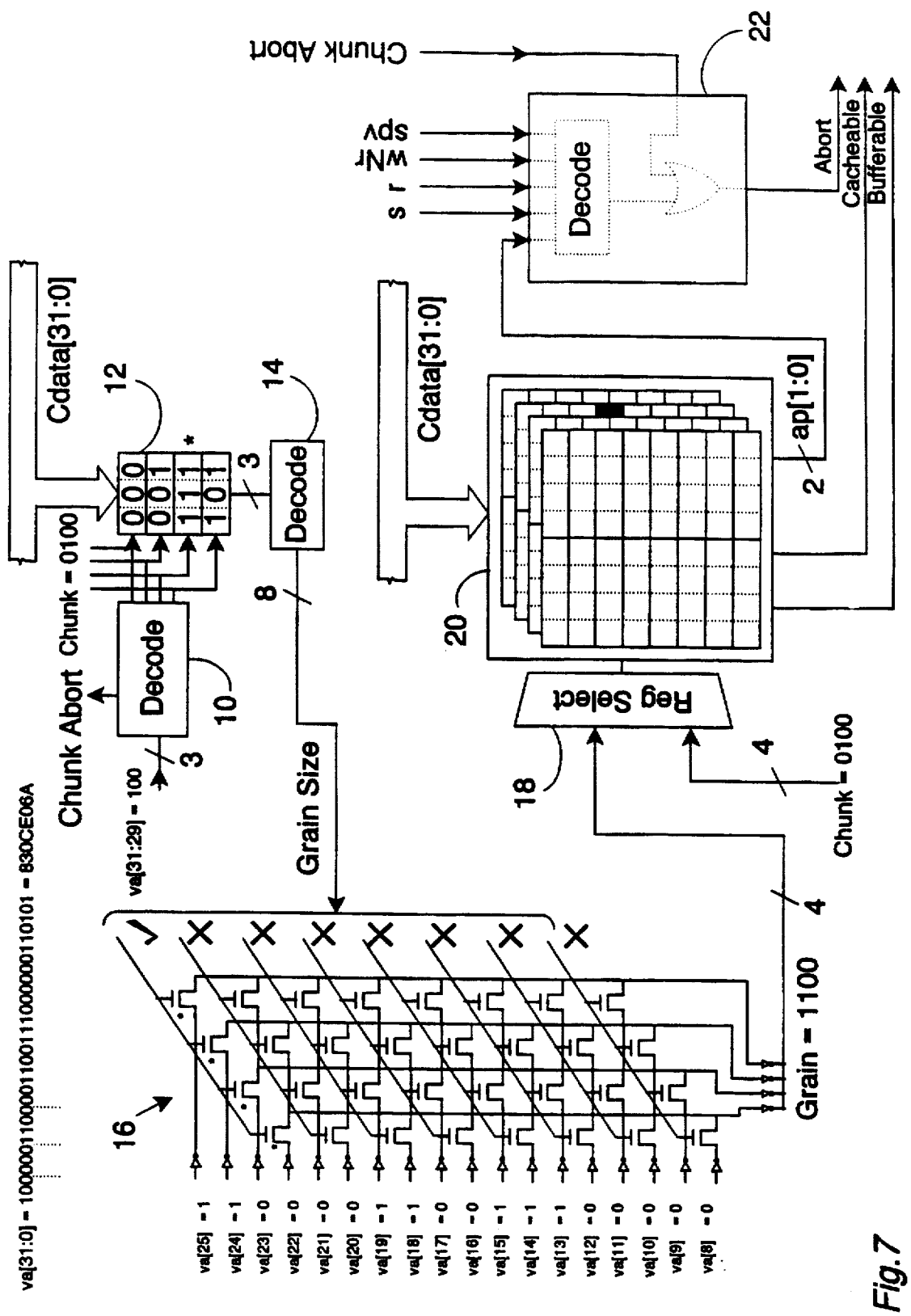

FIG. 7 illustrates an access to address 830CE06A. This address lies within Chunk4. Chunk 4 has a grain size of 4 MBytes. This grain size is represented by a three bit code 111 that is supplied to the grain decoder 14. The grain decoder 14 and the barrel shifter 16 together select the four bits va[25:22] as representing the grain number. These bits are 1100. Accordingly, the grain number and the chunk together select the grain register C (hexadecimal) from the third bank of the grain registers 20.

Figure 8:
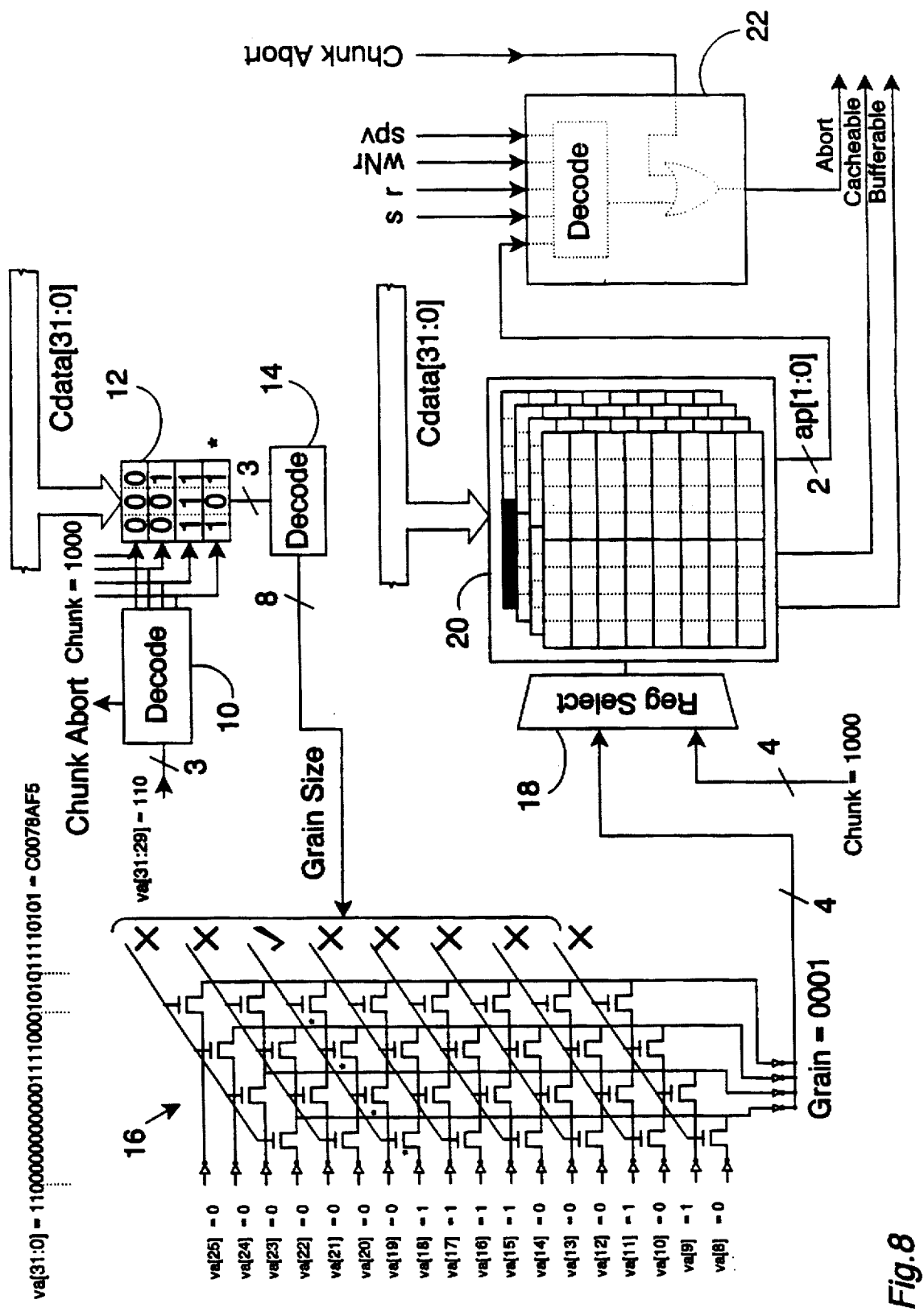

Finally, FIG. 8 illustrates a memory access to address C0078AF5. This address lies within Chunk6. The grain size for Chunk6 is 256 kBytes. Accordingly, the grain number is selected as bits va[21:18], i.e. 0001. Accordingly, grain within 1 the fourth bank of the grain registers 20 is selected.

Figure 9:
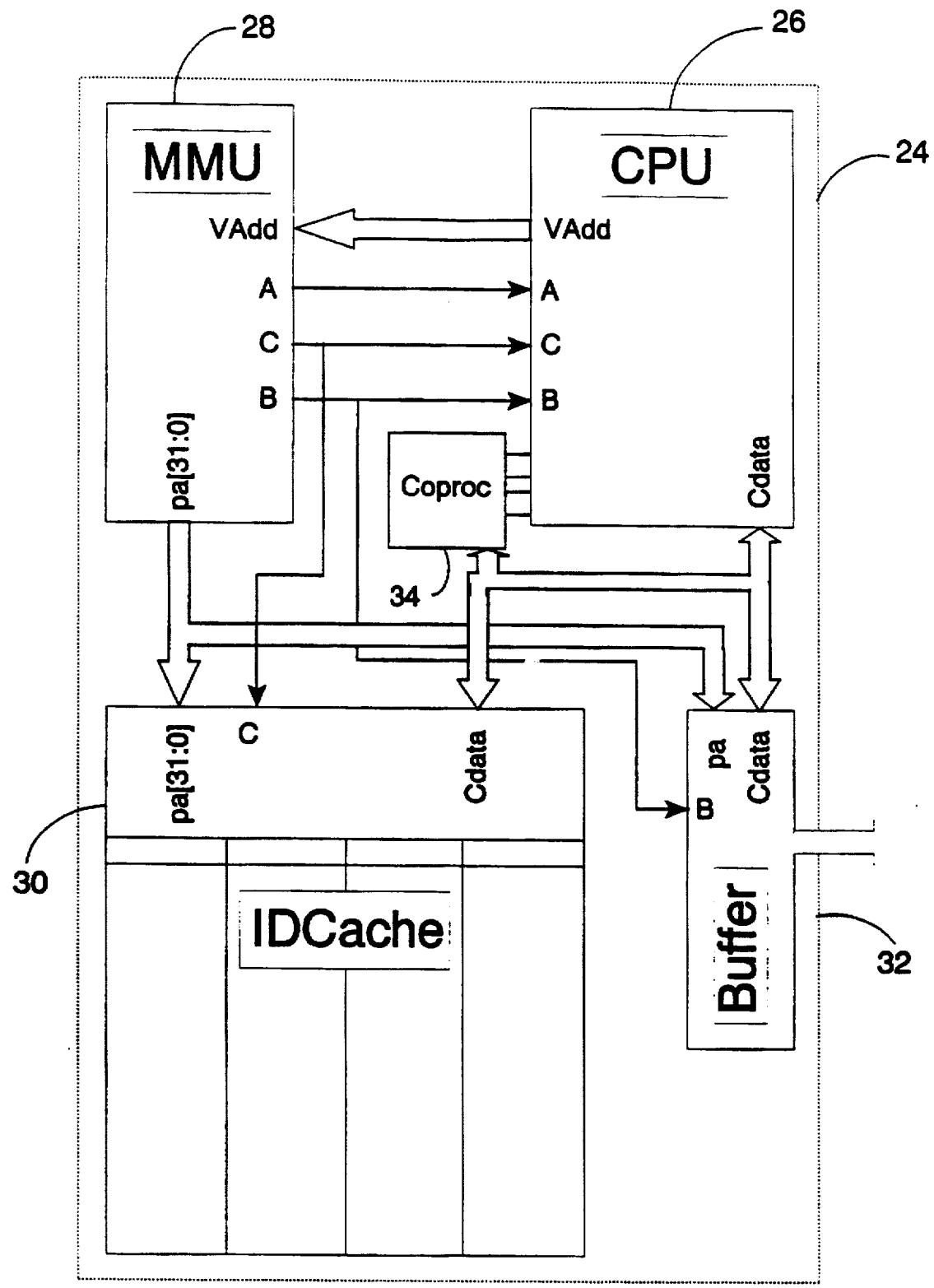
FIG. 9 illustrates an integrated circuit having various functional units including a memory management unit.

FIG. 9 illustrates an integrated circuit 24. The integrated circuit 24 includes a central processing unit core 26, a memory management unit 28, an internal data cache 30, a write buffer 32 and a coprocessor 34. These functional units are linked together by a data bus Cdata[31:0], a virtual address bus va[31:0] and a physical address bus pa[31:0]. The central processing unit core 26 passes a virtual address va[31:0] to the memory management unit 28. The memory management unit analyses the virtual address va[31:0] in the manner discussed in relation to FIGS. 3, 5, 6, 7 and 8. In response to this analysis, the memory management unit 28 outputs a cacheable signal C, a bufferable signal B and an abort signal A. The cacheable signal C is passed to the internal data cache 30. The bufferable signal B is passed to the write buffer 32. All three signals are passed to the central processing unit core 26.

The coprocessor 34 is coupled to the data bus Cdata[31:0] so that it may perform its usual coprocessing functions and in addition write to the chunk registers 12 the grain size specifying codes for the system upon initialisation.

The action of the chunk decoder illustrated in FIG. 3 to generate the chunk abort signal serves to detect and abort memory access attempts to chunks that are not implemented.

The memory management unit 28 also serve to map virtual addresses to real addresses.

Figure 10:
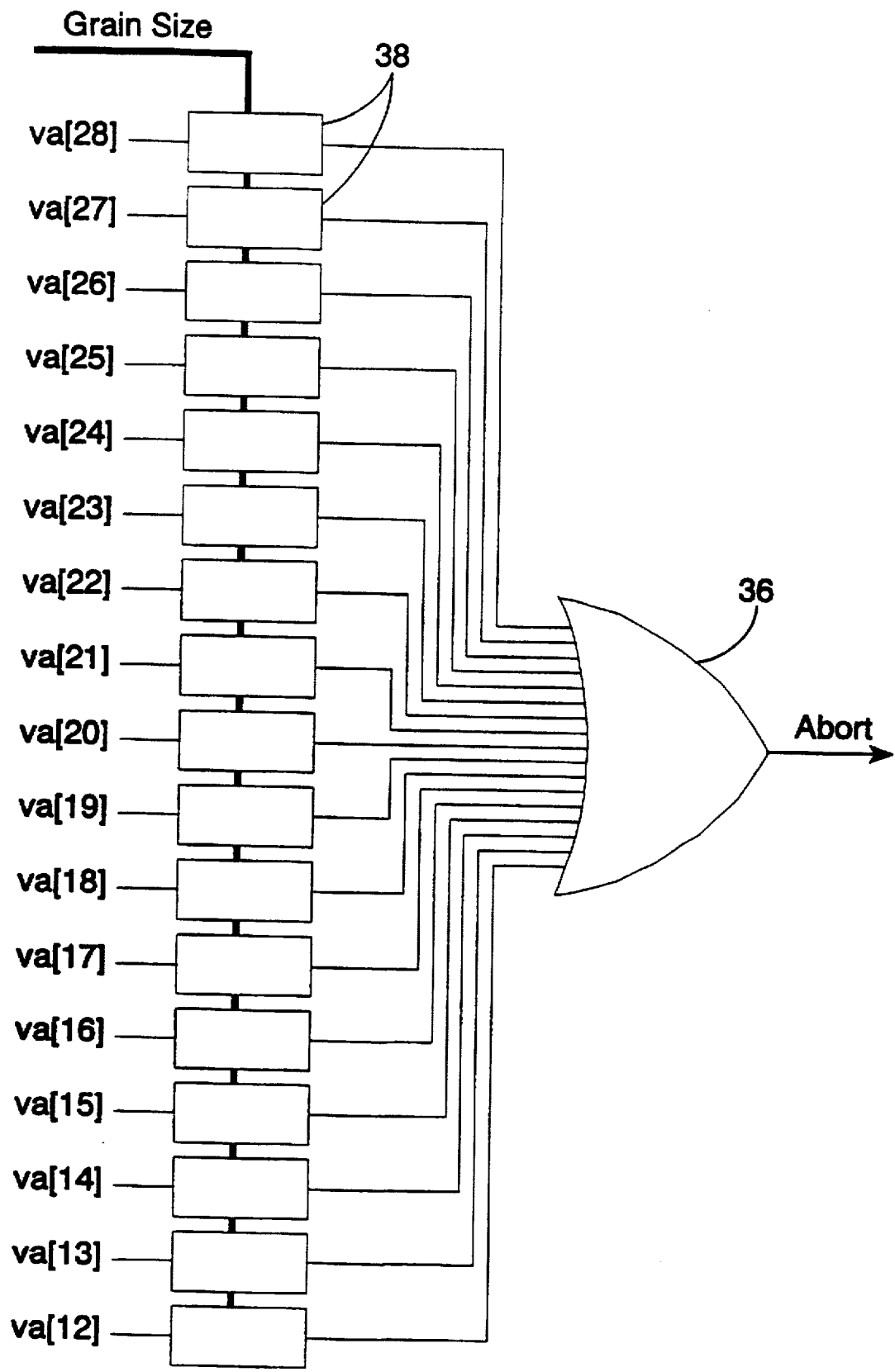
FIG. 10 illustrates a mechanism for detecting invalid memory access attempts to areas of address space above the uppermost sub-section within a main-section.

FIG. 10 illustrates a mechanism for detecting memory access attempts to memory addresses between the uppermost address of the grains within a valid chunk and the top of that chunk. Such memory accesses correspond to accesses to memory addresses in which at least one of the bits is high between the top of the grain number and the bottom of the chunk number. The bottom of the chunk number is always bit va[28] the top of the grain address varies in two bit steps between bit va[12] (for 256 Bytes grains) to va[26] (for 4 MBytes grains). The setting of any of these bits can be detected with an OR gate 36. Each of the bits is fed to the OR gate 36 via a blanking circuit 38. In response to the currently detected grain size from grain decoder 14, respective ones of these blanking circuits 38 serve to block the passage of bits corresponding to valid grain address bits within the sixteen grains. Only bits above the top of the grain address space are allowed to pass to the OR gate 36. If any of these bits is set, then an abort signal is generated. This abort signal is ORed together with the chunk abort signal from the chunk decoder 10 and any abort signal from the mode decoder 22 to generate a composite abort signal.

Figure 11:
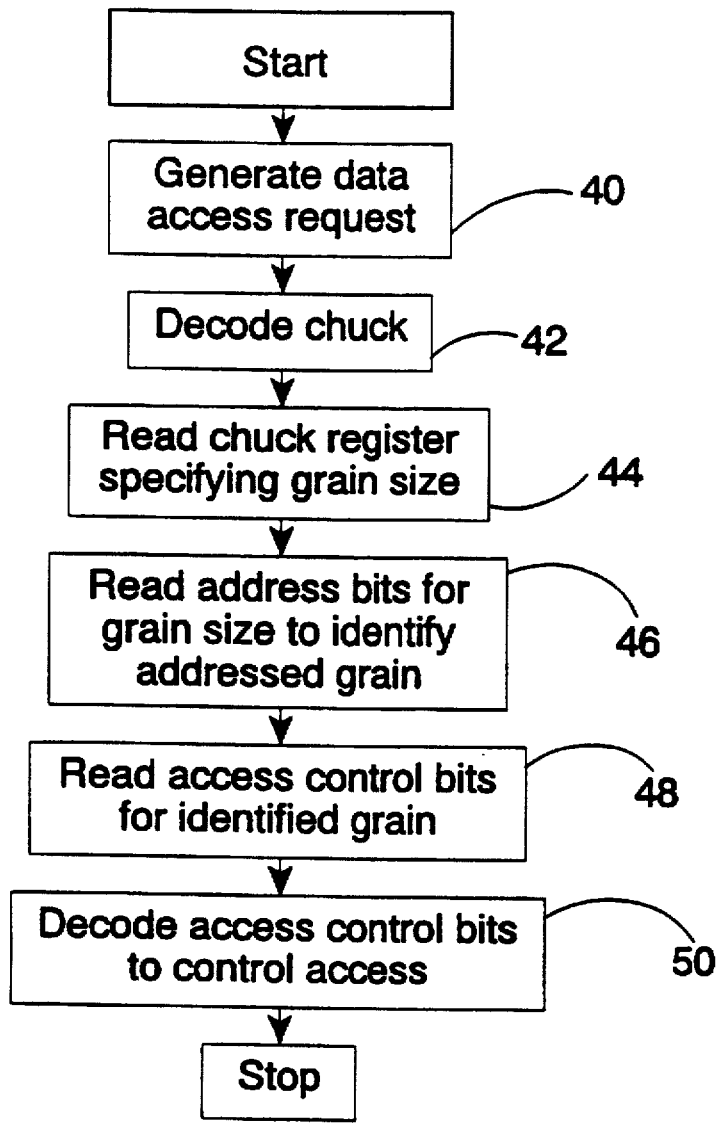
FIG. 11 is a flow chart illustrating the method of the present invention.

FIG. 11 is a flow chart illustrating the operation of the circuit of FIG. 3 as explained with reference to FIG. 5. At step 40 a data access request to an address va[31:0] is generated by the central processing unit core 26 and passed to the memory management unit 28 that includes the circuit of FIG. 3. At step 42 the uppermost three bits va[31:29] of the address are decoded to identify the chunk being addressed. At step 44 the chunk register 12 corresponding to the decoded chunk is read to determine the grain size for that chunk. At step 46 the grain decoder 14 and the barrel shifter 16 cooperate to use the determined grain size to identify those bits within the address va[25:8] that specify the grain being addressed. At step 48 the bits identifying the addressed grain and the bits identifying the chunk are decoded by a register selector 18 that identifies one of the grain registers 20 from which the access control bits are read. At step 50 at least some of the access control bits are decoded by the mode decoder 22 and used to generate signal to control the memory access.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

I claim:

1. Apparatus for processing data, said apparatus comprising:

a data memory for storing data words at respective memory addresses with an address space of said data memory;

means for generating an access request to a data word stored at a specified memory address within said data memory; and a memory management controller for controlling processing of said access request; wherein said memory management controller divides said address space into a plurality of contiguous, fixed size main-sections, each of said main-sections containing a fixed number of sub-sections with said fixed size and said fixed number being the same for each of said main-sections and sub-section size being constant within said main-section and independently set for each of said main-sections, wherein said sub-sections within said main-section are contiguous and said sub-sections are non-contiguous between said main-sections;

said memory management controller stores one or more variable access control parameters for each of said sub-sections, said variable access control parameters for each of said sub-sections being used by said memory management controller to control processing of an access request to a specified memory address within each said sub-section;

said memory management controller includes a plurality of sub-section registers each storing said one or more access control parameters for a respective sub-section; and said specified memory address includes one or more main-section bits, said main-section bits having a fixed position within said specified memory address, and said main-section bits define said main-section within said address space that contains said specified memory address, said specified memory address includes one or more sub-section bits, said sub-section bits having a bit position within said specified memory address that varies with sub-section size, said sub-section bits define a sub-section within said main-section that contains said specified memory address and said sub-section registers are addressed to read said access control parameters for said specified memory address in response to said main-section bits and said sub-section bits.

2. Apparatus as claimed in claim 1, comprising a plurality of main-section registers each storing data defining sub-section size for a respective said main-section.

3. Apparatus as claimed in claim 2, wherein said data defining sub-section size is written to said main-section registers under program instruction control.

4. Apparatus as claimed in claim 3, comprising a coprocessor to said central processing unit core, said main-section registers being written under control of program instructions executed by said coprocessor.

5. Apparatus as claimed in claim 1, wherein said means for generating an access request comprises a central processing unit core.

6. Apparatus as claimed in claim 1, wherein said specified memory address includes one or more main-section bits, said main-section bits having a fixed position within said specified memory address, and said main-section bits define a main-section within said address space that contains said specified memory address.

7. Apparatus as claimed in claim 1, wherein said specified memory address includes one or more sub-section bits, said sub-section bits having a bit position within said specified memory address that varies within sub-section size, said sub-section bits define a sub-section within a main-section that contains said specified memory address.

8. Apparatus as claimed in claim 7, comprising a barrel shifter for selecting said sub-section bits for decoding from within said specified memory address in dependence upon sub-section size for a main-section containing said specified memory address.

9. Apparatus as claimed in claim 1, wherein said one or more access control parameters are written to said sub-section registers under program instruction control.

10. Apparatus as claimed in claim 9, wherein said means for generating an access request comprises a central processing unit core and said sub-section registers are written under control of program instructions executed by said central processing unit core.

11. Apparatus as claimed in claim 1, comprising an abort signal generator for detecting an access request to a specified memory address outside of any sub-section.

12. Apparatus as claimed in claim 11, wherein said specified memory address includes one or more main-section bits, said main-section bits having a fixed position within said specified memory address, and said main-section bits define a main-section within said address space that contains said specified memory address, said specified memory address includes one or more sub-section bits, said sub-section bits having a bit position within said specified memory address that varies within sub-section size, said sub-section bits define a sub-section within a main-section that contains said specified memory address and said main-section bits are the most significant bits of said specified memory address and said sub-section bits are less significant bits of said specified memory address, said abort signal generator generating an abort signal if any bits of said specified memory address between said main-section bits and said sub-section bits are set.

13. Apparatus as claimed in claim 11, wherein one or more of said main-sections are reserved, said abort signal generator generating an abort signal if said specified memory address lies within a reserved said main-section.

14. Apparatus as claimed in claim 1, comprising a write buffer, said one or more access control parameters including a flag indicating whether a write request to said specified memory address may be routed via said write buffer.

15. Apparatus as claimed in claim 1, comprising a cache memory, said one or more access control parameters including a flag indicating whether a write request to said specified memory address may be written in said cache memory.

16. Apparatus as claimed in claim 1, wherein said one or more access control parameters include one or more flags that are logically combined with one or more mode bits indicating a current processing mode of said apparatus to determine if said access request is to be permitted to proceed.

17. Apparatus as claimed in claim 1, said apparatus being an integrated circuit.

18. A method of data processing for operation with a data memory and a memory management controller, said method comprising the steps of:

storing data words at respective memory addresses within an address space of the data memory;

generating an access request to a data word stored at a specified memory address within said data memory; and controlling processing of said access request with the memory management controller; wherein said memory management controller divides said address space into a plurality of contiguous, fixed size main sections, each of said main-sections containing a fixed number of sub-sections with said fixed size and said fixed number being the same for each of said main-sections and sub-section size being constant within said main-section and independently set for each of said main-sections, wherein said sub-sections within said main-section are contiguous and said sub-sections are non-contiguous between said main-sections;

said memory management controller stores one or more variable access control parameters for each of said sub-sections, said variable access control parameters for each of said sub-sections being used by said memory management controller to control processing of an access request to a specified memory address within each said sub-section; and said memory management controller includes a plurality of sub-section registers each storing said one or more access control parameters for a respective sub-section; and said specified memory address includes one or more main-section bits, said main-section bits having a fixed position within said specified memory address, and said main-section bits define said main-section within said address space that contains said specified memory address, said specified memory address includes one or more sub-section bits, said sub-section bits having a bit position within said specified memory address that varies with sub-section size, said sub-section bits define a sub-section within said main-section that contains said specified memory address and said sub-section registers are addressed to read said access control parameters for said specified memory address in response to said main-section bits and said sub-section bits.

* * * * *